INVENTOR
R. E. HOLTZ
BY E. J. Snider
ATTORNEY

United States Patent Office 3,440,367

Patented Apr. 22, 1969

3,440,367

NONREACTIVE ANTISIDETONE NETWORK FOR A TELEPHONE SET

Roger E. Holtz, Freehold Township, Monmouth County, N.J., assignor to Bell Telephone Laboratories, Incorporated, New York, N.Y., a corporation of New York Filed May 6, 1966, Ser. No. 548,274

Int. Cl. H04b 1/12; H04m 1/19

U.S. Cl. 179—170 11 Claims

ABSTRACT OF THE DISCLOSURE

A telephone station network eliminates the conventional need for reactive circuit elements by employing a circuit configuration that employs only transistors and resistive elements or diodes. Availability of adequate gain allows the use of a high impedance network to produce the desired trans-hybrid loss and results in a higher transmitting efficiency than that typically associated with an inductive antisidetone circuit.

This invention relates to telephone set voice circuits and more particularly to voice circuits utilizing resistance hybrid antisidetone balancing networks.

Two-wire subscriber telephone circuits are typically arranged in hybrid type configurations with the transmitter and receiver units mutually conjugate. As a result, signals generated either in the transmitter or in the receiver are substantially or entirely muted in the other. More specifically, speech signal energy generated by the transmitter divides between adjacent inductance coil legs in proportion to the impedance match between the network and the line, one portion of the energy being applied to the line and the other portion being dissipated in the balancing network. Owing to the relative polarities of the interconnected coils, their inductive effects tend to cancel so that very little sidetone energy is coupled into the receiver. The level of sidetone required to approximate the quality of direct conversation is established by controlling the impedance match between the network and the line.

As a result of the undesirably large bulk and high cost of telephone set hybrid induction coils, voice circuits omitting such coils have been devised, the hybrid function being performed instead by a resistive network. Such circuits are shown, for example in Patent 2,838,612 issued to L. C. Pocock June 10, 1958 and in Patent 3,170,043 issued to L. A. Hohmann, Jr., Feb. 16, 1965. The elimination of hybrid coils from telephone speech networks by utilizing circuit forms of the type disclosed by Pocock and Hohmann has become increasingly attractive owing to recent advances in the art of integrated and thin film circuitry. Particularly in noninductive circuits, these advances have resulted in radical reductions in circuit size and cost and in substantial improvements in circuit reliability.

Despite the advantages of resistive hybrid circuits over circuits employing inductive coils, all telephone hybrid or bridge circuits in the prior art share a common disadvantage of low transmitting efficiency. More specifically, this disadvantage involves the dissipation in the balancing network of the hybrid of substantially one-half of the signal power generated by the transmitter. The significance of this condition may readily be appreciated when it is realized that under ideal conditions the elimination of such power losses could allow the use of telephone transmission lines which may theoretically have 6 db more voltage attenuation than present lines. This eventually could result in a savings in the cost of telephone transmission lines or an increase in the range of telephones on conventional lines. In addition to the fact that prior art resistive hybrid circuits have failed to provide a solution for the power loss problem generally inherent in all hybrid circuits, certain other unsolved problems have impeded the widespread commercial adoption of resistive voice network hybrid circuits. For example, the essentially resistive set impedance necessary to achieve an ideal impedance match between the set and line under certain conditions is difficult to attain owing to the inductive reactance of conventional receiver units. A further problem relates to the need for rendering the D-C input resistance of telephone sets substantially independent of carbon transmitter resistances in that transmitter impedance characteristics tend to be erratic. These problems are further complicated in those sets utilizing transistor amplifiers in combination with the telephone transmitter.

Accordingly, a general object of the invention is to improve telephone antisidetone networks.

A specific object is to reduce the loss of power that typically occurs in telephone resistive hybrid antisidetone networks.

Another object is to reduce the effect of the receiver impedance in determining the input impedance of a telephone set that utilizes a resistive hybrid network.

These and additional objects are achieved in accordance with the principles of the invention in a telephone voice circuit employing a resistance hybrid wherein the conjugate receiver and transmitter branches each include a respective transistor amplifier and wherein the receiver branch with its associated amplifier is bridged directly across the hybrid branch formed by the impedance of the line. The remaining branches of the hybrid circuit comprise two individual resistor legs and a network impedance leg. In accordance with the invention, the network impedance leg may comprise only a single resistor or, depending upon the characteristics of the line impedance, it may include a resistance capacitance network which may advantageously be of the distributed type, or, alternatively, it may include a resistance-capacitance network together with an amplifier, the combination being so connected that the resulting two-terminal impedance of that leg appears as the inverse of the resistance-capacitance network.

To illustrate one aspect of the invention, the amplifier that is utilized in series with the receiver may be viewed as a current generator whose current is determined by the balance of the hybrid bridge. The input impedance of the telephone set is determined largely by the receiver-current generator circuit rather than by a conventional network impedance, and accordingly the network impedance may be made relatively high as compared to the line impedance. The sidetone balance in the circuit is determined by the ratios involving the line impedance, the network, and the two purely resistive branches. With the network impedance fixed at a high level as indicated, virtually all of the transmitter current is applied to the line thereby avoiding the conventional dissipation of transmitter signal power in the hybrid.

The principles of the invention as well as additional objects and features thereof will be fully apprehended from the following detailed description of an illustrative embodiment and from the drawing in which.

Figure 1:
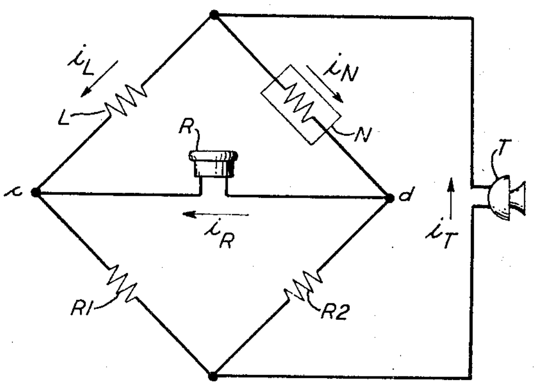
FIG. 1 PRIOR ART
FIG. 1 is a functional network diagram of a resistive hybrid circuit in accordance with the prior art.

Prior art resistive hybrid telephone circuits are represented generally by the Wheatstone bridge arrangement shown in FIG. 1. The branches or legs of this bridge include a transmitter T, a receiver R, a telephone line impedance L, an impedance network N, a first resistive impedance R1 and a second resistive impedance R2. Each of the legs L, N, R1 and R2 is depicted as a single resistor. Depending upon the particular circuit environment however, each or any of these legs may include a plurality of individual circuit components or distributed networks.

The nature and magnitude of the impedances N, R1 and R2 are chosen to achieve a preselected impedance ratio with the impedance of the line. When the desired impedance relation is attained, a voltage null occurs between the nodes *c* and *d* to which the receiver R is connected whenever a current is generated by the transmitter T. The requirement for the anti-sidetone function is met in that the null condition permits very little energy transfer from the transmitter T to the receiver R.

In the bridge arrangement shown in FIG. 1, assuming the transmitter to be a current source, the input impedance of the telephone set is comprised of the network N in series with the combination of the receiver R and impedances R1 and R2. This impedance relation may be expressed as follows:

$$Z_{in}=\frac{(R1+R2)R}{R1+R2+R}+N \qquad (1)$$

In practical applications the network impedance in series with the receiver must approximate the line impedance in order to attain a proper impedance match. In the transmit mode a division of the transmitter current $i_T$ occurs between the line current $i_L$ and the network current $i_N$. The relation between the line current $i_L$ and the transmitter current $i_T$ may be expressed as follows in terms of the bridge impedances:

$$\frac{i_L}{i_T}=\frac{N+R2}{N+R2+L+R1}\Bigg| \text{Transmit Mode} \qquad (2)$$

In view of the input impedance requirements imposed on the network N and on the receiver R, as noted above, the division of transmitter current between the network impedance N and the line impedance L must be on the order of 50% in each branch. Stated otherwise, approximately half of the transmitter generated current is dissipated in the network impedance N while the remaining half is applied to the line impedance L. Hence, as in all prior art telephone hybrid circuits, proper sidetone balance is achieved at the cost of a substantial power loss.

In the receive mode current divides between the receiver R and the impedances R1 and R2 in accordance with the following expression:

$$\frac{i_R}{i_{in}}=\frac{R1+R2}{R1+R2+R}\Bigg| \text{Receive Mode} \qquad (3)$$

where $i_R$ is receiver current and $i_{in}$ is input current. The power reaching the receiver R is diminished inasmuch as the receiver is in series with the network N. Generally the impedance of the receiver R is highly inductive and therefore not suitable, standing alone, for telephone input impedance. Accordingly, it is necessary that the input impedance of the set be made up to a great extent by the network impedance N.

Figure 2:
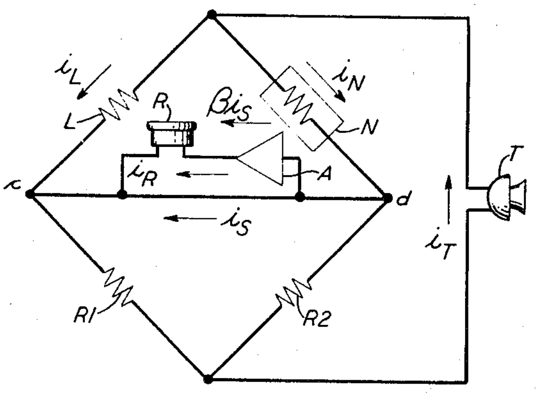
FIG. 2 is a functional network diagram of a resistive hybrid circuit in accordance with the invention.

The influence of the receiver impedance on the telephone set input impedance may be eliminated or at least substantially reduced by modifying the bridge arrangement of FIG. 1, in accordance with the invention, as shown in FIG. 2. In accordance with the invention, a current amplifier or current source A is so connected that the nodes *c* and *d* are shorted and the current flowing through this short is amplified by an amplification factor $\beta$, the amplified current $\beta i_s$ being the receiver current $i_R$.

In this case the input impedance $Z_{in}$ is merely the network impedance N which may be expressed as follows:

$$Z_{in}=N \qquad (4)$$

In the circuit of FIG. 2 is the transmit mode, the ratio between line current $i_L$ and transmitter current $i_T$ is the same as that expressed in Equation 2, assuming the bridge to be balanced. The influence of the impedances R1 and R2 on the ratio between the receiver current $i_R$ and the set input current $i_{in}$ during the receive mode is eliminated, however, and current ratio may be expressed as follows:

$$\frac{i_R}{i_{in}}=\frac{\beta}{1+\beta}\Bigg| \text{Receive Mode} \qquad (5)$$

In accordance with the invention the receiver current $i_R$ can be made approximately equal to the input current $i_{in}$ by utilizing a relatively high amplification factor $\beta$, on the order of 30 to 40 for example, in the receive amplifier A. The bridge arrangement of FIG. 2 represents a substantial improvement in power transfer in the receive mode inasmuch as the receiver R is no longer in series with the network N. The current division in the transmit mode however is not improved.

Figure 3:
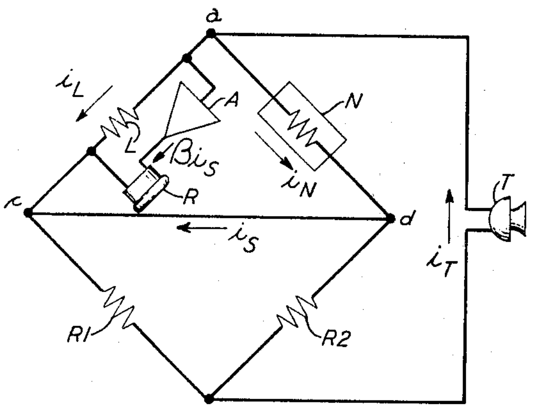
FIG. 3 is a modified version of the circuit shown in FIG. 2.

In the bridge arrangement of FIG. 2 the branch that includes the receiver R and the current amplifier A has a relatively high impedance and accordingly its location can be changed without affecting the balance of the bridge. In accordance with the invention the position of the receiver R and the amplifier A may be shifted advantageously across the telephone line impedance L as shown in the arrangement of FIG. 3. In this case the input current $i_{in}$ is made up of both the current in the network $i_N$ and the current through the receiver and current amplifier $i_R$. The current through the receiver $i_R$, however, is greater than the network current $i_N$ by the amplification factor $\beta$. The input impedance $Z_{in}$ may be expressed as follows:

$$Z_{in}=\frac{N}{1+\beta} \qquad (6)$$

The expression for the ratio between the line current $i_L$ and the transmitter current $i_T$ in the transmit mode does not change and is stated by Equation 2. In the receive mode the ratio between receiver current $i_R$ and input current $i_{in}$ may be expressed as follows:

$$\frac{i_R}{i_{in}}=\frac{\beta}{1+\beta}\Bigg| \text{Receive Mode} \qquad (7)$$

The requirement for sidetone balance remains the same and may be expressed in terms of the following impedance ratios:

$$\frac{L}{N}=\frac{R1}{R2} \text{ or } \frac{L}{R1}=\frac{N}{R2} \qquad (8)$$

With a bridge arrangement in accordance with the invention as shown in FIG. 3, the network impedance N can be made relatively large while still maintaining the proper input impedance. As a result, the impedance R2 may similarly be relatively large in order to balance the bridge. By so doing, transmitting efficiency is substantially improved. For example, when the network impedance N is on the order of 40 times the line impedance L, approximately 97% of the transmitter output current flows through the line impedance L, leaving only approximately 3% of this current to be dissipated in the network impedance N. Consequently, the transmitting efficiency of the network is substantially doubled. Further, in accordance with the invention, if the current amplification ratio $\beta$ is large, on the order of 40 for example, the same efficiency is attained in receiving in that approximately 97% of the input current may be applied to the receiver R.

Figure 4:
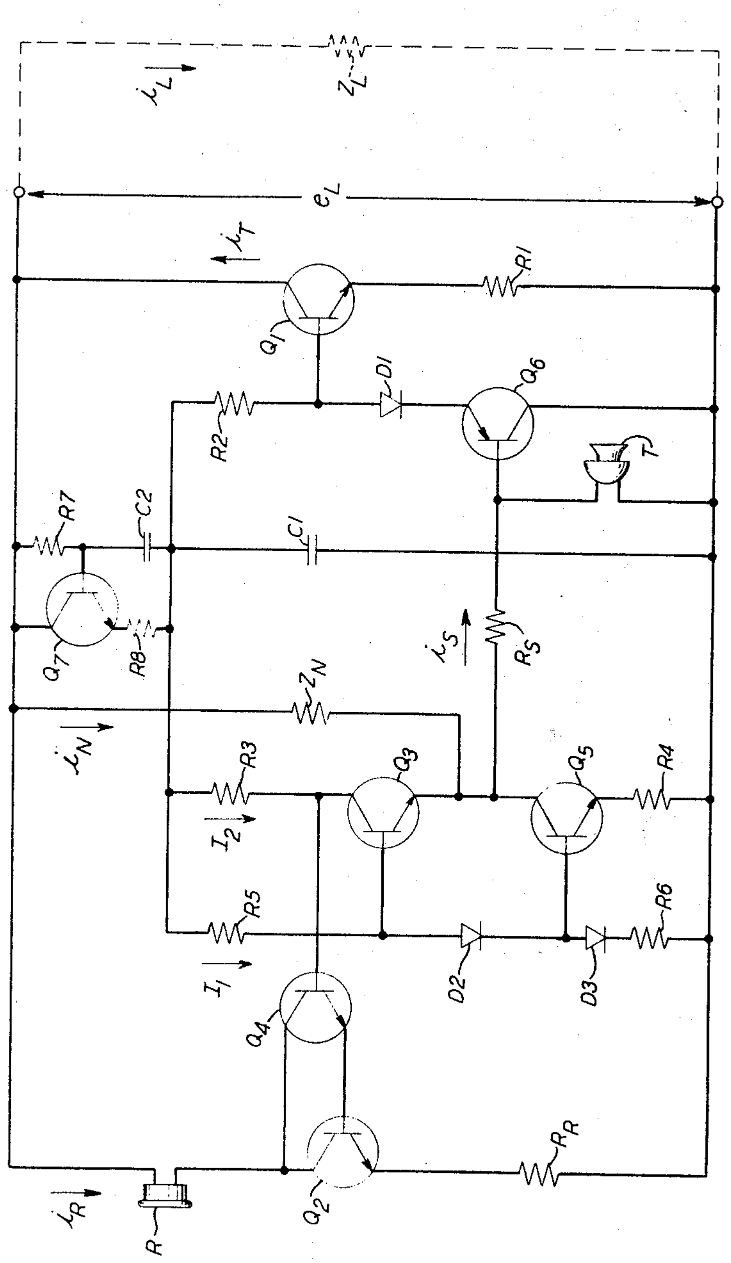
FIG. 4 is a schematic circuit diagram of a telephone set speech network in accordance with the invention.

The functional bridge diagram of FIG. 3 may be realized in accordance with the invention in a complete practical telephone speech network of the type illustrated by the schematic circuit diagram of FIG. 4. Before describing this circuit in detail, it may be useful to identify the specific circuit elements in FIG. 4 that correspond to the respective branches of the bridge network shown in FIG. 3. The network N is represented as the impedance $Z_N$, which may be a distributed R-C network or which may be a simple resistance, as indicated, dependng upon the requirements established by the particular circuit environment. The bridge impedance R2 is realized as the impedance $R_S$, impedance R1 is also identified as R1, line impedance L is identified as $Z_L$, and the receiver R is also identified as receiver R. A transmit current amplifier, not shown in FIG. 3, is realized in the combination of transistors Q1 and Q6 together with diode D1 and resistors R1 and R2. The combination of the short circuit between the nodes *c* and *d* and the current amplifier A in the receiver branch is realized as transistors Q2, Q3, Q4 and Q5, resistors R3, R4, R5, R6 and $R_R$, and diodes D2 and D3. Isolation between the line and the two current amplifiers is provided by transistor Q7 in combination with resistors R7 and R8 and capacitors C1 and C2.

In the transmitter amplifier, transistor Q6 provides a high impedance input for the transmitter T and bias is obtained through the resistance $R_S$ from the receiver amplifier. Diode D1 is employed to raise the D-C voltage on the base of transistor Q1 in order to allow direct coupling. Resistor R2 forms the emitter resistor in the emitter follower configuration of transistor Q6. Transistor Q1 is in the common emitter configuration with R1 as the emitter resistor. With the decoupling provided by transistor Q7 the transmitter amplifier output impedance becomes very large so as to represent a current source.

In the receive amplifier the short circuit between nodes *c* and *d* of the bridge is provided by the emitter input impedance of transistor Q3. This transistor is operated in the common base mode and amplifies the difference between the currents $i_N$ and $i_s$. This difference current is applied to resistor R3, developing a voltage at the base of transistor Q4. Transistors Q4 and Q2 are connected in a Darlington configuration emitter follower presenting a high impedance to resistor R3. Resistor $R_R$ is the emitter resistor. Inasmuch as the current $i_R$ is independent of the impedance of the receiver R, the combination of transistors Q2 and Q4 acts as a current source in series with the receiver R.

For the direct coupling employed, it is necessary to establish a D-C current $I_2$ flowing through transistors Q3 and Q5. To achieve such stabilization a parallel path for a current $I_1$ is provided through resistor R5, diodes D2 and D3, and resistor R6. The current $I_1$ is determined by the voltage across capacitor C1 less the voltage drops across diodes D2 and D3, and resistors R5 and R6. Consequently the voltage at the base of transistor Q5 is the sum of the voltage drop developed across resistor R6 by current $I_1$ and the voltage drop across diode D3. Assuming the voltage drop from base-to-emitter of transistor Q5 to be the same as that across diode D3, the voltage across resistor R4 will then be the same as the voltage across resistor R6. The voltage across resistor R4 determines the current $I_2$ that flows through transistors Q5 and Q3 and resistor R3. As a result, if resistors R4 and R6 have the same value, then the two currents $I_1$ and $I_2$ are approximately the same, with the current $I_1$ being determined chiefly by resistors R5 and R6. The current equality indicated can only be attained, however, if there is a close identity between the base-emitter diode of transistor Q5 and diode D3. Such identity or component matching can readily be achieved by conventional integrated circuit techniques.

Operation in the transmit mode is characterized by the application of a voltage change on the base of transistor Q6 resulting from the current generated by the transmitter T. This voltage change produces a current $i_s$ flowing through resistor $R_s$, while at the same time producing a transmit amplifier output current $i_T$ on the collector of transistor Q1, as indicated. Assuming the hybrid circuit to be in balance with a very limited current flowing to the receiver R, most of the transmitter current $i_T$ is applied directly across the load $Z_L$. A voltage $e_L$ across the line is produced thereby which in turn produces a current $i_N$ through the network impedance. When the requirements for balance are met, as in Equation 8, given the proper ratio of $Z_{in}$ to $Z_L$ and $R_s$ to R1, the current $i_N$ will be the same as the current $i_s$ leaving no net current to flow through transistor Q3 to be amplified as the receive signal.

In the receive mode no voltage is applied at transmitter T and accordingly, the voltage across the line produces a current in the network which is not canceled by an $i_s$ current. This current is amplified by the receiver amplifier and applied to the receiver.

It is to be understood that the embodiment described herein is merely illustrative of the principles of the invention. Various modifications thereto may be effected by persons skilled in the art without departing from the spirit and scope of the invention.

What is claimed is:

1. In a telephone speech network a resistive hybrid antisidetone circuit connected to a telephone line comprising a Wheatstone bridge configuration having a first leg comprising only a single first resistive element, a second leg comprising only a single second resistive element, a third leg comprising a noninductive network and a fourth leg comprising a current source in series relation with a receiving transducer, said fourth leg being the only one of said legs connected directly across said line.

2. Apparatus in accordance with claim 1 wherein said noninductive network comprises only a resistive element.

3. Apparatus in accordance with claim 1 wherein said noninductive network comprises only a distributed R-C network.

4. A telephone speech network comprising, in combination, a resistive antisidetone bridge circuit connected across the terminals of a telephone line, a first leg of said circuit comprising only first resistive elements, a second leg of said circuit comprising only second resistive element, a third leg comprising a noninductive network and a fourth leg comprising amplifying means in series with a receiving transducer, said fourth leg being the only one of said legs being connected directly across said terminals.

5. Apparatus in accordance with claim 4 including a transmitter and a transmitter amplifier connected between the junction of said first and second legs and the junction of said third and fourth legs.

6. Apparatus in accordance with claim 5 wherein said amplifier comprises a first transistor with its collector-to-emitter path bridged between one side of said line and and the end of said first resistive leg not connected to the other side of said line, a second transistor with its collector-to-emitter path bridged between other side of said line and the base of said first transistor, said transmitter being connected between said other side of said line and the base electrode of said second transistor.

7. Apparatus in accordance with claim 5 including means providing isolation between said line and said amplifying means and said amplifier.

8. Apparatus in accordance with claim 7 wherein said isolation means comprises a transistor having a collector electrode connected to one side of said line, a base electrode connected to the other side of said line by way of capacitive elements and to said one side of said line by way of a resistive element, and means connecting the emitter electrode of said last named transistor to said amplifying means and to said amplifier.

9. A telephone set speech network comprising a resistive antisidetone bridge circuit connected across the terminals of a telephone line in a Wheatstone bridge configuration having a first leg comprising only first resistive elements, a second leg comprising only second resistive elements, a third leg comprising a noninductive network, a fourth leg comprising amplifying means in series with a receiving transducer, said fourth leg being connected across said terminals, the impedance of said network exceeding the impedance of said line by a substantial multiple and said amplifying means having an amplification factor of the same order of magnitude as said substantial multiple.

10. A telephone speech network for connection to the terminals of a telephone line comprising a resistive antisidetone bridge circuit in a Wheatstone bridge configuration having first and second legs each comprising a respective resistive element and no inductive elements, a third leg comprising a noninductive network having an impedance N, and a fourth leg comprising amplifying means having an amplification factor $\beta$ in series relation with a receiving transducer, said fourth leg being the only one of said legs adapted for connection directly across said terminals, the input impedance of said speech network being determined by $$\left|\frac{N}{1+\beta}\right|$$

and the ratio of the current through said receiver to the input current received from any connecting telephone line being equal to $$\left|\frac{\beta}{1+\beta}\right|$$

11. A telephone set speech network for connection to a telephone line having an impedance L looking into said line comprising, in combination, a resistive hybrid circuit in a Wheatstone bridge configuration having first and second resistive legs with impedances R1 and R2, respectively, a third leg including a noninductive network with an impedance N, a fourth leg having a receiving transducer and a current amplifier in series relation for connection directly across the terminals of said line, impedance and current relationships in said speech network being expressed as follows:

$$Z_{in}=\frac{N}{1+\beta}$$

where $Z_{in}$ is the input impedance of the speech network, and $$\frac{i_R}{i_{in}}=\frac{\beta}{1+\beta}$$

where $i_R$ is the current in the receiver resulting from a line current of $i_{in}$ and $$\frac{L}{N}\approx\frac{R1}{R2}$$

References Cited

UNITED STATES PATENTS 2,950,351 8/1960 Leman.

KATHLEEN H. CLAFFY, *Primary Examiner.*

W. A. HELVESTINE, *Assistant Examiner.*

U.S. Cl. X.R.

179—81, 170